Oct. 24, 1967 A. M. WERTH 3,349,398

SATELLITE COMMUNICATION SYSTEM

Filed Aug. 27, 1964 5 Sheets-Sheet 1

INVENTOR.
ANDREW M. WERTH
BY Percy P. Lantzy
Attorney

INVENTOR.
ANDREW M. WERTH
BY Percy P. Lantzy
Attorney

SATELLITE COMMUNICATION SYSTEM

Filed Aug. 27, 1964 5 Sheets-Sheet 3

INVENTOR.
ANDREW M. WERTH
BY Perry P. Lantz Jr.
Attorney

INVENTOR.
ANDREW M. WERTH
BY [signature]
Attorney

SATELLITE COMMUNICATION SYSTEM

Filed Aug. 27, 1964 5 Sheets-Sheet 5

INVENTOR.
ANDREW M. WERTH
BY
Attorney 3,349,398

SATELLITE COMMUNICATION SYSTEM

Andrew M. Werth, Paramus, N.J., assignor to International Telephone and Telegraph Corporation, Nutley, N.J., a corporation of Maryland Filed Aug. 27, 1964, Ser. No. 392,421
20 Claims. (Cl. 343—100)

This invention relates to satellite communication systems and more particularly to a medium altitude satellite communication system having handover facilities.

Medium altitude satellites are those satellites which rotate in their orbit about the earth at a rate greater than the rate of rotation of the earth. To provide a satellite communication network utilizing medium altitude satellites, it is necessary to provide mutual visibility between a single satellite and the two terminals of the radio communication path. Mutual satellite visibility is limited to a fixed time defined by the period and inclination of the satellite orbit. This restriction on the communication system dictates that the terminal-to-terminal communication path will have to be periodically re-established as the satellite actively in use begins to disappear from the view of either terminal of the communication path. The rerouting or transferring of the communication path from one satellite with expiring mutual visibility to a second satellite mutually visible to the two terminals for the subsequent operating period is known as the handover process. The equipment required for this transfer of communication path from an expiring mutually visible satellite to a mutually visible satellite is known as the handover equipment. The handover process, and likewise the handover equipment, may be further defined by specifying the speed with which handover occurs. Using speed as the determining factor, three classes of handover are indicated hereinbelow.

(1) Delayed handover applies to the case of a single antenna and equipment at each station wherein a warning is given to the subscribers utilizing the communication path (voice or data), communication is interrupted and the antennas are slewed to the next mutually visible satellite at which time the communication path is re-established between the two terminals of the communication system.

(2) Fast handover applies to the case where each terminal has more than one set of communication equipment. While the first set of communication equipment is maintained in operative communication between the two terminals, the second set of equipment in the two terminals is establishing a parallel communication path through another mutually visible satellite. When the satellite incorporated in the first communication path disappears from mutual view, the communication is switched to the second path to continue communication between the terminals. Voice circuit disruptions would be in the order of 100 milliseconds and would be unnoticeable by the subscribers other than for a possible momentary click. Slow speed digital data, such as Teletype, could also be accommodated on this link without suffering excessive error at the times of handover. High speed digital data, however, could not be accommodated in a communication system having this type of handover without introducing gross burst errors at the times of handover.

(3) Instantaneous handover, like fast handover, employs two sets of communication equipment at each terminal with the addition of special equipment which introduces variable delay factors to equalize communication path lengths in the operative communication path including the satellite about to disappear from mutual view and the parallel communication path including a second satellite in mutual view of the two terminals. In essence, instantaneous handover provides for communication transfer from one communication path utilizing one satellite to another communication path using another satellite which is unnoticed by the subscribers in any way at the time of handover regardless of the speed of the data being handled by the communication system.

Therefore, an object of this invention is to provide a satellite communication system employing medium altitude satellites having instantaneous handover facilities.

The problems to be solved to implement instantaneous handover are as follows:

(a) Given two communication paths of different lengths, how can one best introduce delay compensation in either or both paths so as to cause the output data of both paths to be synchronous to within an acceptable predetermined tolerance at the time when it becomes necessary to switch between the two communication paths at handover.

(b) Under certain conditions how can the delay compensation of (a) be continuously varied as a function of changing communication path lengths so as to provide constant path lengths for all communication paths independent of time, satellite position or equipment delay variations.

(c) In providing (a) and/or (b), it is required that no bits be inserted or lost from the bit stream if code correlation is to be maintained.

(d) In providing (a) and/or (b), the absence of any real message on the communication path must be compensated for by generating a predetermined pattern of ones and zeros.

(e) Where synchronous detection is required the data detection equipment cannot tolerate sizeable deviation of the received data stream rate since their timing references are generated from ultra-stable local clocks. If such is the case, the communication path delay must be continually compensated for so that it will appear as a constant delay. If this is not done the Doppler effect introduced by the variation of path length may sufficiently alter the data rate so as to disrupt detection of the received data stream.

(f) Where synchronous detection is not a requirement, then a local clock can be generated from the incoming data stream itself and used to generate local timing. Such a scheme does not require continuous path length correction since the clock rate will change concurrently with the changing data stream rate. However, it is clear that in this method, two different communication path lengths changing at two different rates will produce two different incoming data stream rates resulting in a further complication of the instantaneous handover equipment to achieve handover between communication paths.

Another object of this invention is to provide a medium altitude satellite communication system having instantaneous handover equipment overcoming the foregoing problems.

Still another object of this invention is to provide a medium altitude satellite communication system wherein the length of the operable communication path and the length of the relieving communication path are maintained constant and equal.

A further object of this invention is to provide a medium altitude communication system having instantaneous handover equipment wherein the communication path delay is continuously compensated for in both the operative and relieving communication paths to prevent altering the data rate on the two communication paths.

Still a further object of this invention is to provide in a medium altitude satellite communication system an arrangement to maintain the communication path between two terminals through a repeater satellite constant.

A feature of this invention is the provision of a satellite communication system comprising first and second terminals and at least one satellite mutually visible to both of the terminals to establish a communication path therebetween through the mutually visible satellite. At least one of the terminals will include a means to provide information proportional to the range between its terminal and the mutually visible satellite. Coupled to the last mentioned means and included in the communication path is a means responsive to the range information to maintain the length of the communication path constant.

Another feature of this invention is to provide the range information in digital form which is alternately coupled to two delay lines of adjustable lengths wherein the lengths of the delay lines are adjusted in accordance with the digital information coupled thereto. Means are further provided coupled to the delay lines to couple the last adjusted delay line into the communication path to adjust the delay of the communication path with the latest range information available.

Still another feature of this invention is the provision of a means to provide the range information by measuring the range between at least one of the terminals and the mutually visible satellite at a predetermined rate.

A further feature of this invention is the provision of a means at each of the terminals to measure the range between the related one of the terminals and a mutually visible satellite to thereby adjust the amount of delay to be inserted in the communication path at both terminals to maintain the length of the communication path constant.

Still a further feature of this invention is the provision of a pair of communication and delay compensation equipment at each of the terminals of the communication system. The first communication and delay compensation equipment of each terminal cooperates to provide a first communication path between a first mutually visible satellite, measure the range between the related one of the terminals and the first satellite, and insert the proper amount of delay at both terminals to maintain this first communication path length constant. The second communication and delay compensation equipment of each terminal, just prior to handover, is put into operation to provide a second communication path between the two terminals through a second mutually visible satellite, measure the range between the related one of the terminals and the second satellite, and insert the proper amount of delay at both terminals to maintain the second communication path length constant and equal to the length of the first communication path.

Still a further feature of this invention is the provision of a means disposed at each terminal of the communication system coupled to the receiving equipment of each pair of communication and delay compensation equipment to provide handover between the first and second communication paths upon coincidence of the data stream propagated along these two communication paths.

The above-mentioned and other features and objects of this invention will become more apparent by reference to the following description taken in conjunction with the accompanying drawings, in which.

Figure 2:
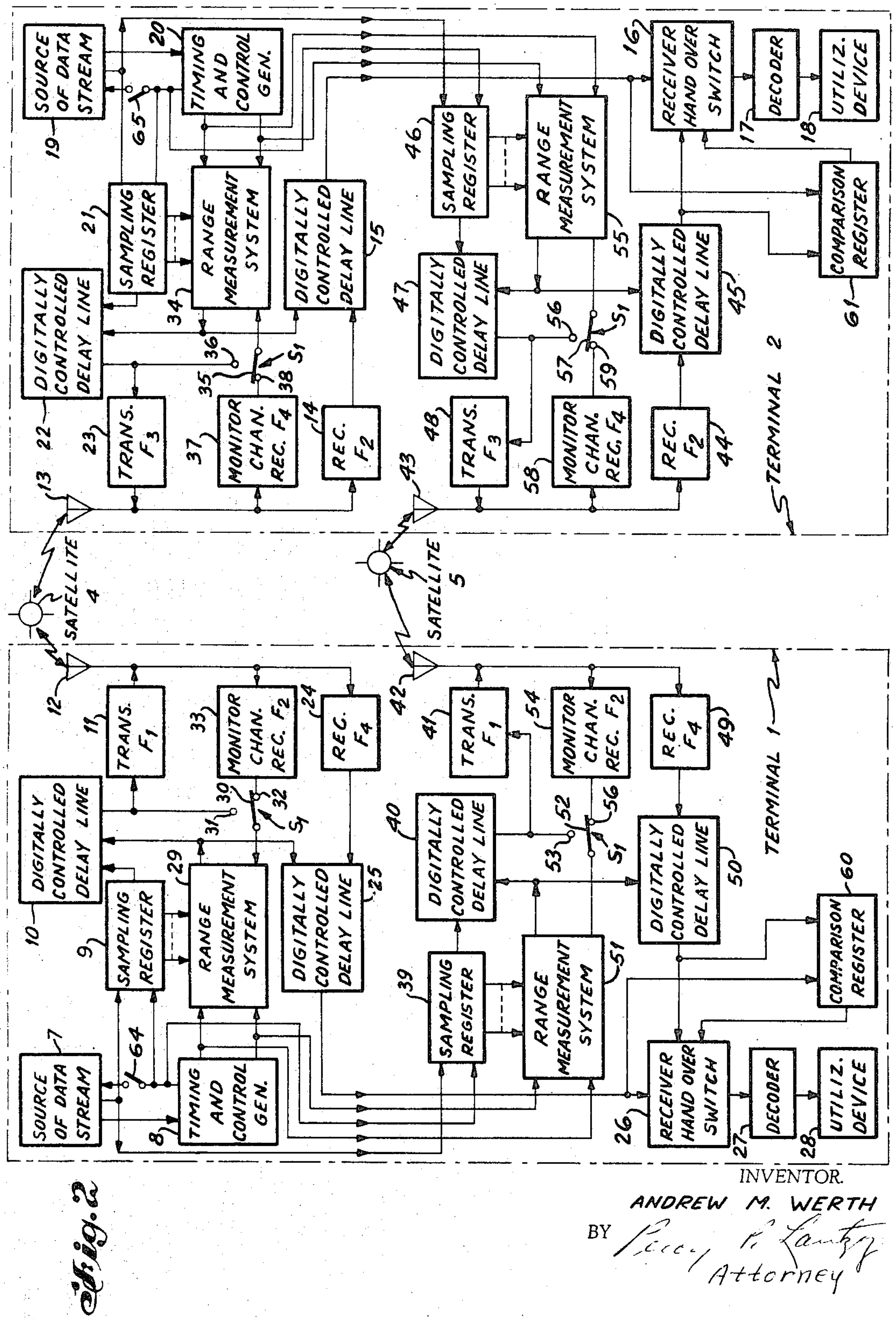
FIG. 2 is a schematic diagram in block form of one embodiment of a communication system in accordance with the principles of this invention.
Figures 3, 4, 5:
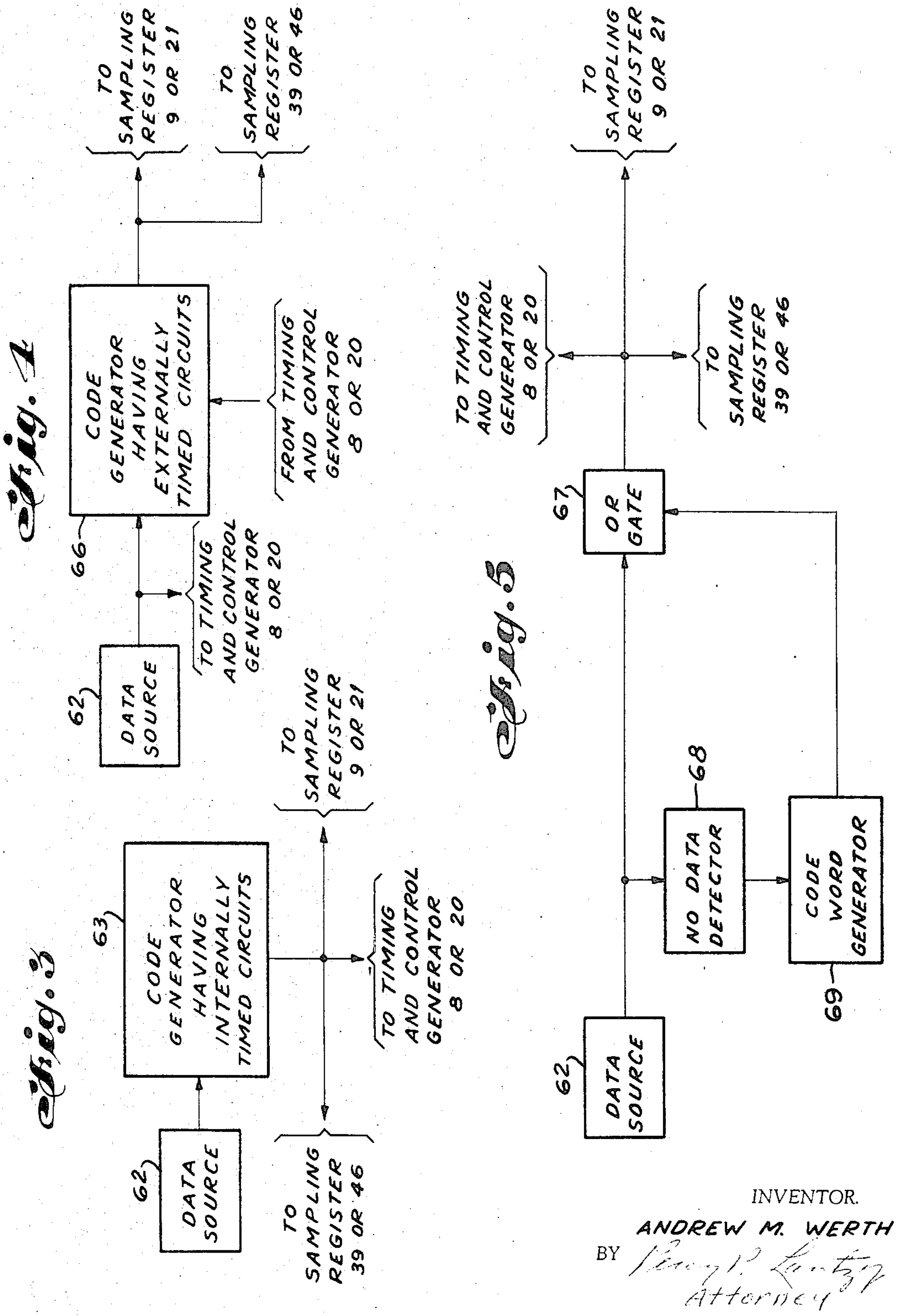
Figure 6:
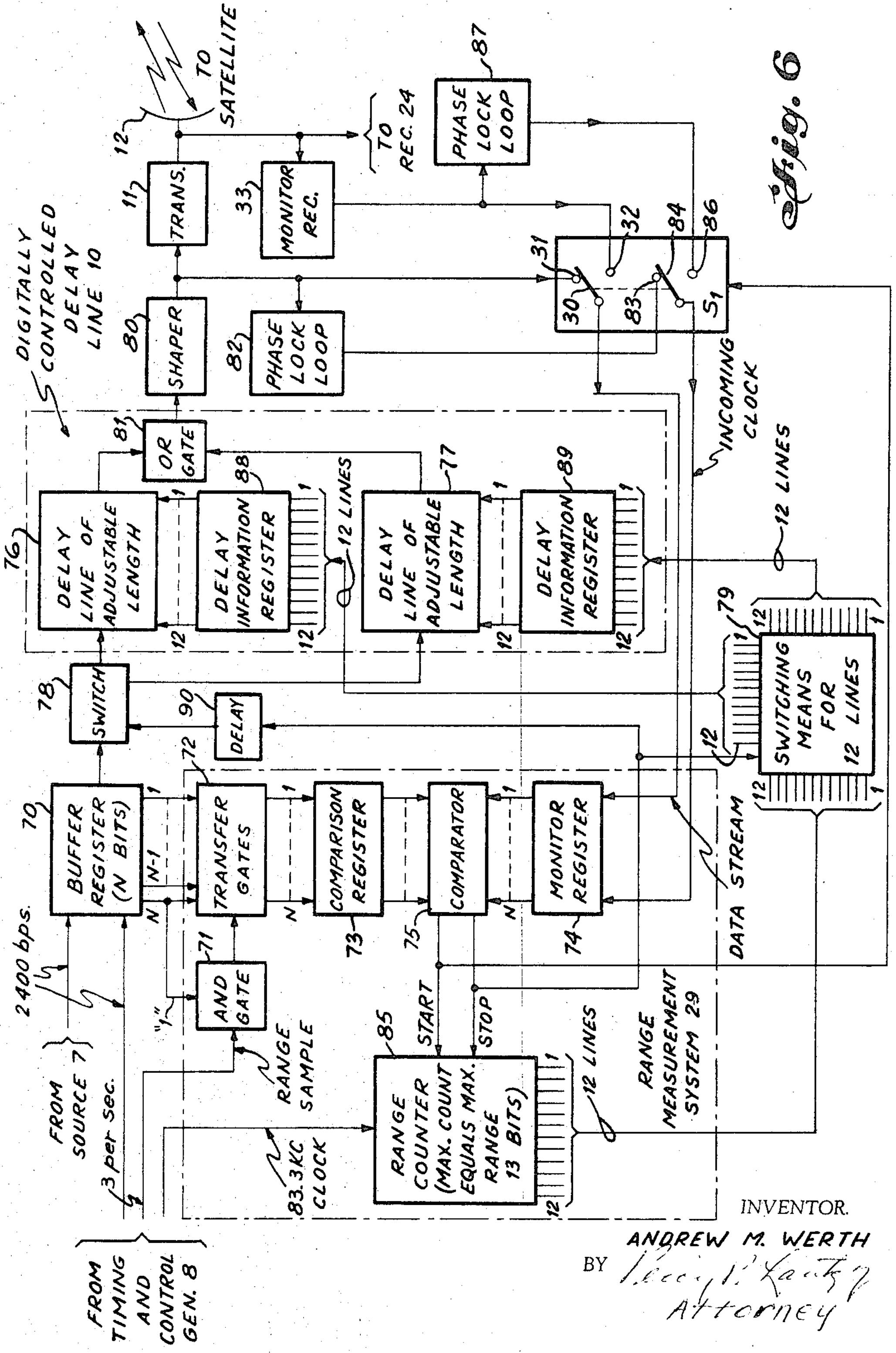
Figure 7:
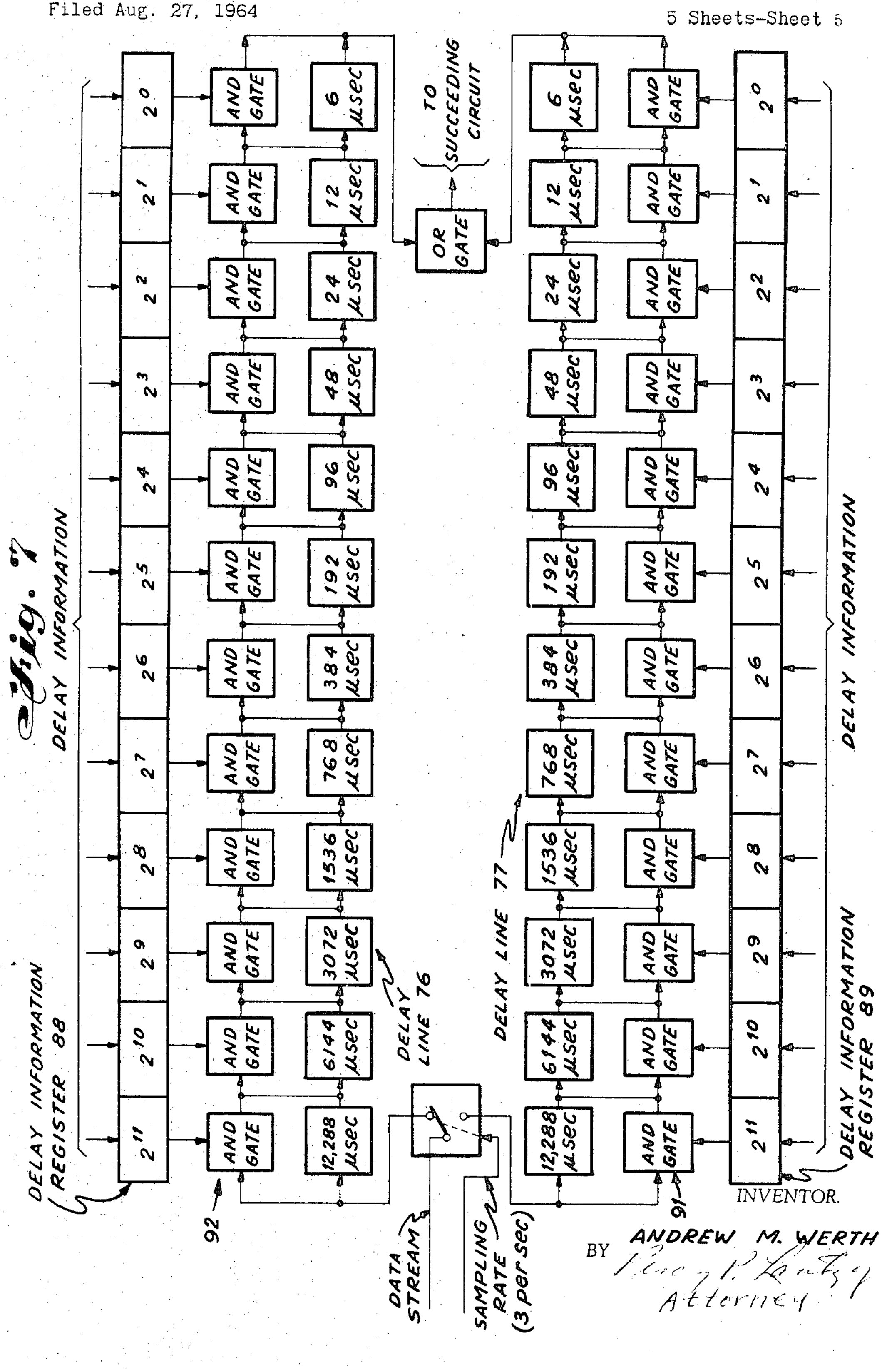

FIGS. 3, 4, and 5 are schematic diagrams in block form of three different embodiments of the source of data stream of FIG. 2;

FIG. 6 is a schematic diagram in block form presenting in greater detail one embodiment of the range measurement systems and digitally controlled delay lines of FIG. 2; and FIG. 7 is a schematic diagram in block form presenting in greater detail the digitally controlled delay line of FIG. 6.

Figure 1:
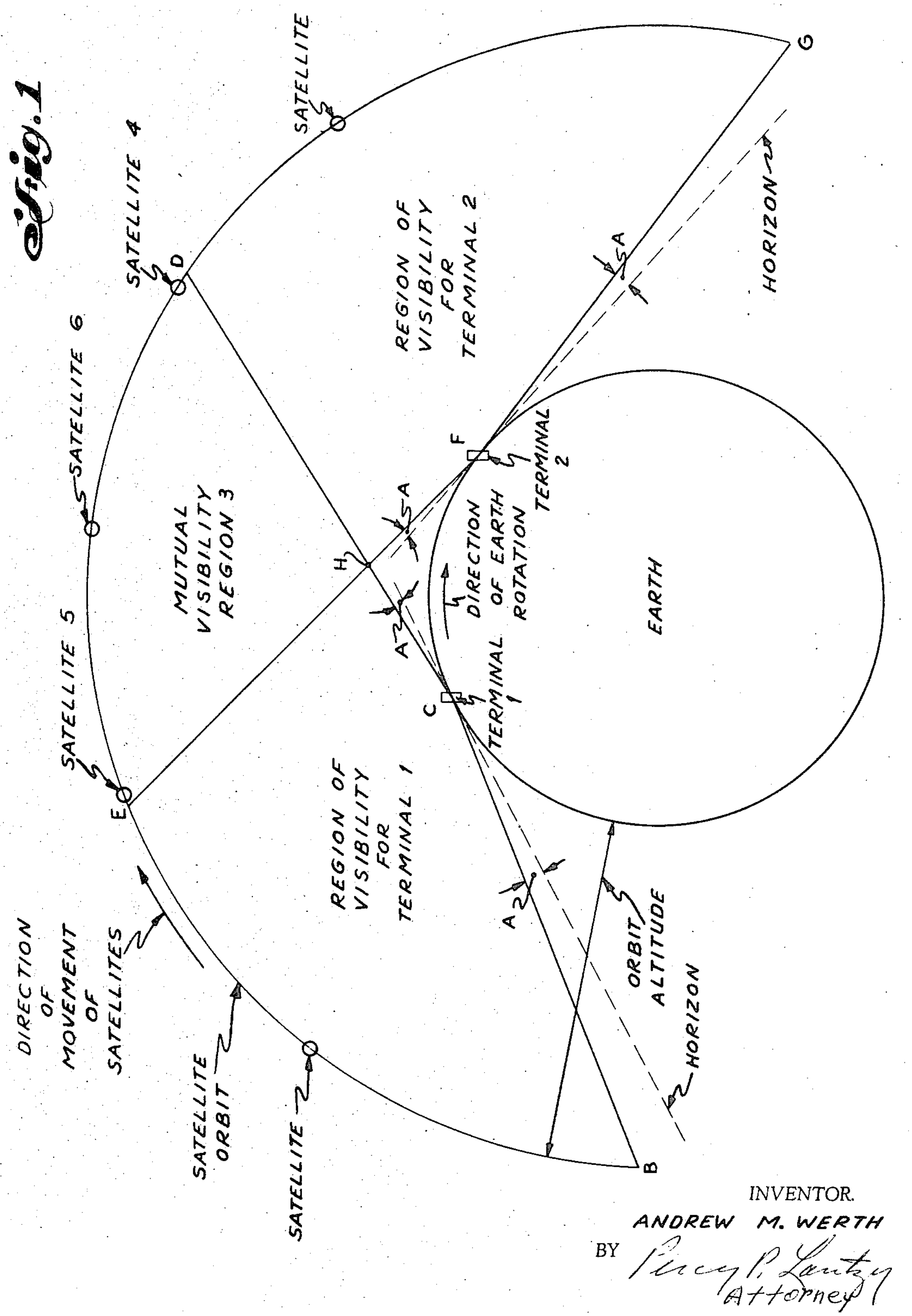
FIG. 1 is a diagrammatic illustration representing the medium altitude satellite communication system in accordance with the principles of this invention.

Referring to FIG. 1, there is illustrated therein a diagram of a medium altitude satellite communication system in accordance with the principles of this invention illustrating terminal 1 and terminal 2 disposed in spaced points on the earth. Terminals 1 and 2 can communicate with each other through a satellite when the satellite is mutually visible to both terminals. If the satellites are randomly and widely spaced, there is a possibility that during certain times no satellite will be mutually visible to both terminals 1 and 2.

A satellite is considered usable for communication if its elevation angle above the theoretic horizon is larger than some specified angle A. This angle limitation is influenced by local terrain and performance of the communication system itself. Typical values used for angle A may vary from 5 to 10 degrees.

Angle A and the orbital altitude of a satellite for a randomly spaced satellite system define a region of satellite visibility for terminal 1 whose perimeter is defined by lines BC, CD and the arc DEB. The same information defines the region of visibility for terminal 2 whose perimeter is defined by the lines EF, FG and the arc EDG. The mutual visibility region 3 is defined by the intersection of the two regions of visibility of terminals 1 and 2 having a perimeter defined by lines HD, HE and the arc ED. When a satellite is present in region 3, it is simultaneously visible from both terminals 1 and 2. In general, the extent of the mutual visibility region 3 and the minimum number of randomly spaced satellites to provide a specified quality of service depend on the location of the terminals 1 and 2, the distance between these terminals, the satellite orbital altitude, the orbit inclination angle, and the minimum terminal elevational angle A for communication with the satellite.

It has been mentioned hereinabove that terminals 1 and 2 are disposed on the earth, that is, they are ground terminals and communicate with each other through a mutually visible satellite. It should be pointed out that terminals 1 and 2 are not necessarily restricted to being ground terminals. Terminals 1 and 2 could be disposed on space platforms and communicate with each other through a mutually visible satellite. Thus, the illustration and description of FIG. 1 are not meant to restrict the invention. Rather, the illustration and description of FIG. 1 are employed as an example to aid in the description of the communication system of this invention.

The system disclosed herein is a system for communication between terminal 1 and terminal 2 through a medium altitude satellite or a satellite system including randomly spaced medium altitude satellites. For purposes of explanation, let us assume that terminal 1 and terminal 2 are communicating with each other over a communication path including satellite 4. According to the illustration in FIG. 1, satellite 4 is about to leave the mutual visibility region 3 which makes it desirable to switch the communication from this first communication path through satellite 4 to a parallel communication path through another mutually visible satellite. As will be described hereinbelow, the handover equipment will be placed in operation such that communication from terminal 1 to satellite 4 to terminal 2 will be switched to a second communication path including satellite 5 which has just entered mutual visibility region 3.

Immediately hereinabove, it has been described that communication has been transferred from the communication path including satellite 4 to the communication path including satellite 5. It should be understood, however, that the handover from one satellite to another does not necessitate the transfer of communication from a satellite leaving mutual visibility region 3 to a satellite which has just entered mutual visibility region 3. Rather, the communication can be transferred to a communication path including a satellite disposed in any position within the mutual visibility region 3, such as satellite 6.

To aid in the description of this invention, let us examine typical satellite path geometry to determine the order of magnitude of communication path delays and delay differences. Typically terminal 1 and terminal 2 may be separated by 2000 nautical miles and communicate with each other through a satellite system having a 5000 nautical mile circular orbit system with random inclination angle orbits. The lower limit of elevation angle A is taken as 7½ degrees above the local horizon. If the locus of the 7½ degrees lines of sight, FG and FE are extended to a sphere GDEB whose radius is $R_e$ (earth radius) plus 5000 nautical miles (the orbital altitude), a cone of visibility for terminal 2 is formed, the base of the cone being defined by a line EG (not shown for clarity purposes). The intersection of the cone FEG and the sphere GDEB forms an "umbrella" shaped surface within which satellite locations are useful for communication with terminal 2. Note that the perimeter of the above-defined "umbrella" surface represents a locus of maximum slant range for the communication system. Similarly, the intersection of the cone CBD and sphere GDEB forms an "umbrella" shaped surface for terminal 1. The intersection of the two above-defined "umbrella" surfaces represents the contour of mutual visibility. Any satellite existing within this surface contour may be used to communicate with terminals 1 and 2. The intersection of the two "umbrella" surfaces is a curved elliptical surface. Since the perimeters of the "umbrella" are loci of maximum slant range for each terminal, the intersection of these two perimeters represents points of maximum slant range sum or maximum path length. The minimum slant range sum is located at the center of the intersection surface (the surface of region 3). This can be shown geometrically but for purposes of brevity consider the extreme case in which terminals 1 and 2 are coincident. Then the intersection surface is simply the 5000 miles spherical surface intersected by the cone of visibility. Clearly, the minimum slant range sum is the distance to the center of the surface. These two slant ranges then correspond to the minimum and maximum path length for the 5000 mile orbit satellite system.

With the above information, it is now possible to calculate what actual ranges are involved. For a 5000 nautical mile orbit the maximum slant range at 7½ degrees elevation angle A is 7200 nautical miles. Therefore, for any two terminals sharing a mutual visibility surface on a 5000 nautical mile sphere, the maximum range sum is 14,400 nautical miles. The slant range to the center of the intersection surface (the surface of region 3) is 5720 nautical miles for a terminal separation of 2000 nautical miles. In the limit, the minimum slant range is 5000 nautical miles if the separation distance between terminals is reduced to zero. The minimum slant range sum will therefore be taken as 10,000 nautical miles. The maximum transmission delay, using a delay of 6.2 microseconds per nautical mile is 89.3 milliseconds and the minimum delay is 62 milliseconds. The maximum compensation to be accommodated in accordance with the principles of this invention is the differential delay of 27.3 milliseconds.

It can be shown that this differential delay of 27.3 milliseconds will have a certain effect upon various types of communication. Unsynchronized "in the clear" voice will not be noticeably affected by an interruption or overlap of this magnitude. At the most a listener would hear a click or a slur in a word which will not affect overall intelligibility. For a 100 words per minute Teletype system using 7.4 Baudot code, an interruption or overlap of 27.3 milliseconds would cause an error of at the most two bits in the data stream. Since the code is 7.4 bits per character, at the most two characters would be in error each time the communication path was switched between satellites. Such an error could be tolerated in a Teletype system, since the time of occurrence of the error can be indicated at the receiver on the print-out and a request for message repetition can be made if the error is significant.

Clearly, data communication at rates in excess of about 200 bits per second are affected by an interruption or overlap of 27.3 milliseconds and burst errors (6 bits at 200 bits per second) are introduced by failing to provide compensation for the differential delay.

Thus, to provide instantaneous handover which requires continuous adjustment of the path length to maintain it constant, satellite slant range information must be provided either from precomputed data or from measurement. In the latter case, it will be necessary to introduce delay compensation at both the transmitting and receiving ends of the communication path, since the range information would be measured from each of the terminals to the satellite.

As a nonlimiting example of the instantaneous handover system of this invention, the following values of various components will be assumed: (1) The value of perimeters of the medium altitude satellite system above described. (2) Data stream rate of 2400 bits per second with a maximum differential path delay of 35 milliseconds.

The maximum Doppler effect expected at 2400 bits per second is approximately 0.14 bit per second. At 2400 bits per second, a delay of 36 milliseconds corresponds to 84 bits. Thus, if instantaneous handover is incorporated in the above-described communication system, burst errors of 84 bits could be present in the data stream at the times of handover.

Referring to FIG. 2, there is illustrated a schematic diagram in block diagram form of a communication system having instantaneous handover equipment of the range measuring type in accordance with the principles of this invention. It should be remembered that the system of FIG. 2 illustrates only one embodiment by which instantaneous handover can be obtained. Rather than employing the range measuring system of FIG. 2, precomputed ephemeris data which is extrapolated can be employed to provide continuous range information as a function of satellite position, that is, time.

The description of the system of FIG. 2 will be started by assuming that an operational communication path exists between terminal 1 and terminal 2 through satellite 4. The data stream from source 7 is coupled to timing and control generator 8 and sampling register 9. The data stream coupled to generator 8 cooperates in generating the necessary timing signals for terminal 1. One of the timing signals from generator 8 controls the storage of the data stream in register 9. The data stream output of register 9 is coupled through digitally controlled delay line 10 to transmitter 11. The output of transmitter 11 is radiated from antenna 12 to satellite 4. Satellite 4 retransmits the radiated signal to antenna 13 of terminal 2. The retransmitted signal received by antenna 13 is coupled to receiver 14 and, hence, to digitally controlled delay line 15. The output of delay line 15 is then coupled to a receiver handover switch 16 being in the appropriate position to pass the data stream to decoder 17 and, hence, to utilization device 18.

To provide return communication and, hence, two-way communication over this operational communication path, a data stream source 19 is coupled to timing and control generator 20 to assure proper timing signals for terminal 2. Source 19 is also coupled to sampling register 21 which is under control of generator 20 for storing the data stream at predetermined intervals therein. The output of sampling register 21 is coupled to digitally controlled delay line 22 and, hence, to transmitter 23. The signal output of transmitter 23 is radiated from antenna 13 to satellite 4. From satellite 4, the communication signal from transmitter 23 is coupled to receiver 24 by antenna 12. The output signal of receiver 24 is passed through digitally controlled delay line 25 and, hence, to receiver handover switch 26 being in an appropriate position to pass the signal from the output of delay line 25 to a decoder 27 and, hence, to utilization device 28.

The foregoing describes substantially a well known two-way communication system. However, it should be remembered that the problem solved by the system of this invention is of maintaining a constant path length in the communication path. This is accomplished by sampling the data bits stored in register 9 in terminal 1 and applying these bits at a predetermined rate to range measurement system 29. Switch S1 has its contact 30 coupled to terminal 31 to couple the data stream applied to the input of transmitter 11 to the range measuring system 29. Upon coincidence of the sample removed from register 9 and the data applied to the input of transmitter 11, the range measurement system 29 is started. Once the range measurement has started, contact 30 of switch S1 is moved to terminal 32. The sampled portion of the data stream transmitted from transmitter 11 is returned from satellite 4 over a monitor channel. The monitor channel signal is received by receiver 33 whose output is applied to system 29 to stop the operation of the measurement system. At this time the measurement system will provide an output indicating the range from terminal 1 to satellite 4. It will be noted that system 29 is under control of certain signals coupled from generator 8 which will be explained in greater detail with respect to FIG. 6. The output of system 29 is digital information proportional to the range of terminal 1 from satellite 4 which is coupled to delay line 10 to introduce the proper delay in the transmitting portion of the communication path at terminal 1. The same information from system 29 is coupled to delay line 25 to introduce the proper delay in the receiving portion of the communication path at terminal 1.

This same operation of measuring the distance between terminal 2 and satellite 4 is accomplished by range measurement system 34, wherein a sample of the data stream stored in register 21 is periodically coupled to system 34 and contact 35 is coupled to the input of transmitter 23 to start the operation of range measurement system 34 upon coincidence of the sampled portion of the data stream removed from register 21 and applied to transmitter 23. The sampled portion of the data stream is transmitted from transmitter 23 to satellite 4 and returned from satellite 4 over the monitor channel. Monitor channel receiver 37 receives the signal on the monitor channel and with contact 35 connected to terminal 38 the range measurement system 34 is stopped. The information now present in system 34 is judiciously divided by two to provide the range between terminal 2 and satellite 4. This range information then is coupled to delay lines 22 and 15 to insert in the transmitting and receiving portions of the communication path at terminal 2 the appropriate amount of delay.

The total delay present in delay lines 10 and 15 equals the total delay present on delay lines 22 and 25. Each pair of delay lines cooperate to provide a communication path having a constant path length regardless of the position of satellite 4 and the direction of communication over the communication path.

In the foregoing description, it will be observed that there is a first means, such as means 29 and 34 to provide information proportional to the range between the related one of the terminals and the satellite included in the communication path and second means coupled to the first means, such as delay lines 10, 15, 22 and 25 to maintain the communication path length constant for data transmitted either from terminal 1 to terminal 2 through satellite 4 or from terminal 2 to terminal 1 through satellite 4.

Now let us assume that satellite 4 is about to pass from the mutual visibility region 3 (FIG. 1) and that it is desired to maintain communication by providing instantaneous handover of the communication from satellite 4 to satellite 5 which will be mutually visible to both terminals 1 and 2 for the subsequent operating period.

The equipment necessary to provide instantaneous handover between satellite 4 and satellite 5 includes for transmission from terminal 1 to terminal 2 a sampling register 39 coupled to source 7 to store therein under control of a signal from generator 8 the data stream. The output signal from sampling register 39 is coupled to digitally controlled delay line 40 to transmitter 41 and via antenna 42 to satellite 5. The information radiated from antenna 42 is received by antenna 43 in terminal 2. The signal received by antenna 43 is coupled to receiver 44 and, hence to digitally controlled delay line 45. The signal at the output of delay line 45 is coupled to an input of switch 16 which prior to handover will not pass the data stream received in receiver 44 to decoder 17 since the communication system employing the communication path including satellite 4 is still operable. To provide communication from terminal 2 to terminal 1, the data stream of source 19 is coupled to sampling register 46 whose output signal is coupled to digitally controlled delay line 47. The output signal of digitally controlled delay line 47 is coupled to transmitter 48 for radiation from antenna 43 to satellite 5 and, hence, for reception by antenna 42 for application to receiver 49. The output signal of receiver 49 is coupled to digitally controlled delay line 50 whose output signal is coupled to an input of handover switch 26 which prior to actual handover is blocked to the signal from delay line 50 since the communication between terminals 1 and 2 in either direction is still being maintained on the communication path including satellite 4.

Before the handover process can take place, it is necessary to determine the amount of delay to be inserted by delay lines 40 and 45 and delay lines 47 and 50 to provide a constant length for the communication path including satellite 5 in either direction and also to render the length of this communication path equal to the length of the communication path including satellite 4. As before, this is accomplished by employing in terminal 1 a range measurement system 51 which receives from register 39 a sample of the data stream stored therein which is compared to the data stream present at the input of transmitter 41 when contact 52 of switch S1 is moved to terminal 53. Upon coincidence of the sample of the data stream removed from register 39 and the input to transmitter 41, the operation of range measuring system 51 will be started. A return of the data stream from satellite 5 is received in monitor channel receiver 54 which is coupled to system 51 through terminal 56 and contact 52 of switch S1. System 51 detects the data stream sample which started its operation and provides, as described in connection with systems 29 and 34, information in digital form proportional to the range between terminal 1 and satellite 5. This information is coupled to delay line 40 and delay line 50 to insert in the transmission portion of this second communication path and the receiving portion of this second communication path at terminal 1 the proper amount of delay to compensate for the delay experienced by the signal traveling from antenna 42 to satellite 5.

At terminal 2 a similar range measurement arrangement is included to determine the range between terminal 2 and satellite 5. This range measurement arrangement includes range measurement system 55 which has coupled thereto at predetermined intervals a sample of the data stream stored in register 46 and also the data stream at the input of transmitter 48 over terminal 56 and contact 57 of switch S1. When the data at the input of transmitter 48 coincides with the sample of the data stream removed from register 46, the operation of system 55 is started.

The data stream transmitted by transmitter 48 is returned from satellite 5 over the monitor channel and received by monitor receiver 58 whose output signal is coupled over terminal 59 and contact 57 to system 55. The operation of system 55 is stopped upon detection of the sample of the data stream that started system 55 and at this time provides information in digital form proportional to the range between terminal 2 and satellite 5. The information output of system 55 then controls delay lines 45 and 47 to insert in the transmission portion of terminal 2 and the receiving portion of terminal 2 the proper amount of delay to compensate for the delay experienced in communicating between terminal 2 and satellite 5. Thus, the length of this communication path regardless of whether we are transmitting from terminal 1 to terminal 2 or from terminal 2 to terminal 1 is maintained constant and equal to the communication path including satellite 4 by the cooperative action of range measurement systems 51 and 55 and their associated ones of delay lines 40, 45, 47 and 50. Once the length of the communication path including satellite 5 has been rendered equal to the length of the communication path including satellite 4, as described above, instantaneous handover from satellite 4 to satellite 5 can be automatically accomplished.

To provide this automatic handover, there is provided a comparison register 60 in terminal 1 which is coupled to the output of delay line 50 and the output of delay line 25. Comparison register 60 compares the data stream at the output of each of these delay lines to provide an indication that the data on the relieving communication system including satellite 5 is substantially in coincidence with the data on the operating system including satellite 4. Once this coincidence is detected, register 60 provides an output signal to activate handover switch 26 to block the data stream present at the output of delay line 25 and to pass the output signal of delay line 50 to decoder 27 and, hence, to utilization device 28.

A similar arrangement is provided in terminal 2 in the form of comparison register 61 which is coupled to the output of delay line 45 and the output of delay line 15. When coincidence between the data stream at the output of delay line 15 and the output of delay line 45 is detected in comparison register 61, an output signal is generated to operate upon handover switch 16 to block the data stream at the output of delay line 15 and to pass the data stream at the output of delay line 45 to decoder 16 and utilization device 17. When both of switches 16 and 26 have been activated, as above described, handover has been completed, that is, communication has been transferred from the communication path including satellite 4 to the parallel communication path including satellite 5.

The output signals of comparison registers 60 and 61 indicate that the communication path including satellite 4 and the communication path including satellite 5 are equal in length and of course will be maintained so by the measuring systems of their appropriate terminals.

An audio-visual system will be initiated at each terminal after completion of handover. The equipment providing this signal is not illustrated in FIG. 2 but it will be obvious to one skilled in the art that such equipment could be coupled to the output of register 60 in terminal 1 and the output of register 61 in terminal 2. Also there can be equipment provided for an exchange of information between terminals 1 and 2 relative to the completion of the handover at the two terminals, such as by an order wire channel. This arrangement would prevent terminals 1 and 2 from discontinuing communication on the originally operative communication path before the relieving communication path is in a position to be made operative.

The description of the system of FIG. 2 has been concerned with causing a handover between an operative communication system including a communication path having satellite 4 therein (the upper portion of FIG. 2) to a relieving communication system including a communication path having satellite 5 therein (the lower portion of FIG. 2). It should be noted that the same operation takes place to transfer the operative communication system including the communication path having satellite 5 therein (the lower portion of FIG. 2) to a relieving communication system including a communication path having another mutually visible satellite therein (upper portion of FIG. 2) when satellite 5 is about to leave the mutual visibility region 3 (FIG. 1).

Further, it should be noted that transmitter 11 is illustrated to operate with a carrier frequency $F_1$ while transmitter 23 is illustrated to operate at carrier frequency $F_3$. This allows satellite 4 to distinguish between transmissions. Satellite 4 retransmits communications from transmitter 11 at carrier frequency $F_2$ while communications from transmitter 23 are repeated from satellite 4 at carrier frequency $F_4$. Therefore, receiver 14 and monitor receiver 33 are tuned to operate at carrier frequency $F_2$ while receiver 24 and monitor receiver 37 are tuned to operate at carrier frequency $F_4$. A similar arrangement of carrier frequencies is provided with the transmitter and receiver equipment in terminals 1 and 2 for the communication path through satellite 5. The frequencies in this particular portion of terminals 1 and 2 need not necessarily be different from the frequencies in the portion of terminals 1 and 2 employing the communication path through satellite 4, since antennas 12 and 42, and 13 and 43 will be pointing to different points in space, thus providing isolation between the two communication paths.

It should be noted, however, that this is only one way of separating two-way communication signals on a single communication path as well as two-way communication signals on two different communication paths. There are other well known ways of maintaining the various radio frequency signals of terminals 1 and 2 separated to prevent cross-talk.

In accordance with the principles of this invention, it is necessary to have at all times a data stream present in both communication paths just prior to handover to enable the determination of the range between the terminals and the satellites which they intend to employ as part of the operable and relieving communication paths. This restriction will determine the configuration of sources 7 and 19. There are several configurations of these sources that will at all times provide digital signals for transmission from the related terminal to the related satellite to permit the measurement of the range between the terminal and the related satellite.

FIGS. 3, 4, and 5 illustrate three variations of sources 7 and 19. Another consideration which must be present in selecting the type of sources 7 and 19 is the manner in which the data stream is controlled in time. Variations of this are also illustrated in FIGS. 3, 4, and 5.

Referring to FIG. 3, a source of data 62 in the form of digital bits is coupled to a code generator 63 including timing circuits to generate timing signals from the data received from source 62. The output of generator 63 is a properly timed stream of data which may be coupled to registers 9 or 21 and 39 or 46 and also used to initiate timing of control generator 8 or 20. This type of configuration for sources 7 and 19 is actually illustrated generally in FIG. 2 with switches 64 and 65 positioned as illustrated. In other words, no timing of the code generator is received from generator 8 in the case of terminal 1 or generator 20 in the case of terminal 2.

Referring to FIG. 4, there is again included data source 62 which is coupled to a code generator 66 having timing circuits receiving timing signals from an external source. To provide the timing for code generator 66, the output of source 62 is coupled to generator 8 in the case of terminal 1 or generator 20 in the case of terminal 2 which will enable these generators to generate the timing from the data stream of source 62. Once the timing has been established in generators 8 and 20 the proper timing signal is coupled back to code generator 66 through switches 64 and 65 (FIG. 2) in their closed position. This will provide a properly timed coded output of the data from source 62 for coupling to sampling registers 9 and 39 in the case of terminal 1 and 21 and 46 in the case of terminal 2.

The arrangements of sources 7 and 19, as described in connection with FIGS. 3 and 4, have each included a code generator which has the advantage that even in the absence of data from source 62 the code generator will produce a stream of ones and zeros in a predetermined pattern so that even with the absence of data from source 62 it is possible to measure the range between the terminals and the satellite incorporated in the operating communication path and the satellite incorporated in the relieving communication path.

It should be pointed out that it is not necessary to employ a code generator in the sources 7 and 19 to enable the continuous measurement of range and the continuous adjustment of the communication path length to maintain the path length of the operating system constant and the path length of the relieving system constant and equal to the path length of the operating system. This is illustrated by referring to FIG. 5, wherein data source 62 is coupled to OR gate 67 for application to the sampling registers in terminal 1 or the sampling registers in terminal 2 as well as to the timing and control generators of their associated terminals. When data source 62 has no actual data thereon this is detected in detector 68 which will be rendered operative if no data is present at the output of source 62 for a predetermined period of time to produce an output to trigger generator 69 into operation to provide a predetermined code word during the periods of no data from source 62. The output of generator 69 is coupled to OR gate 67 and, hence, to the other circuitry coupled thereto.

Referring to FIG. 6, there is illustrated therein in more detail the cooperative arrangement and components of range measurement system 29 and digitally controlled delay line 10. It should be remembered that the cooperative arrangement and components of range measurement systems 34, 51 and 55 and digitally controlled delay lines 15, 22, 25, 40, 45 47 and 50 are identical to the system disclosed in detail in FIG. 6. It should be noted also that the information of system 29 not only controls delay line 10, but also delay line 25 which has the same configuration as delay line 10 of FIG. 6. The same statement may be made with respect to the other range measurement systems which actually control two associated digitally controlled delay lines as illustrated in FIG. 2.

The data stream from source 7 is coupled to the sampling register of FIG. 2 which is illustrated in FIG. 6 as a buffer register 70 of the shift register type. Buffer register 70 has N stages which will store N bits of the data stream from source 7. N is chosen sufficiently large to guarantee the high probability of non-ambiguous data stream comparison when returned bits are correlated over a given period. The data stream passing through register 70 is sampled in parallel at a fixed rate which is a function of the satellite range rate. The time of sampling (phase of sampling signal) is controlled so that a "1" always exists in the last bit position (Nth stage). This selection of phase sampling signal to provide the "1" in stage N is to prevent ambiguity in the comparison that will take place in the range measurement system. This can be illustrated by the following:

Outgoing data stream sample is 010010
Incoming data stream sample is 10010

If these two samples are compared in an arrangement where the last stage is normally "0," an indication will be received that a coincidence is achieved. However, there is actually an error present and there is no time coincidence between the outgoing and incoming data stream samples. However, by requiring that a "1" appears in the last stage of buffer register 70 at the time of sampling there will be a non-ambiguous comparison since Outgoing data stream sample 110010 and
Incoming data stream sample 110010 thereby resulting in a non-ambiguous coincidence of the outgoing and incoming data stream sample.

For a 5000 nautical mile satellite system, maximum range rate (round trip) say from terminal 1 to satellite 4 back to terminal 1, does not exced 2 nautical miles per second. Since this represents 12 microseconds per second of change in delay, a sampling rate of 3 per second will suffice to introduce negligible error ($\frac{1}{100}$ of a bit) in the path delay correction.

When the sampling signal is supplied from generator 8 to AND gate 71 and a "1" appears in the last stage of register 70, a signal will be produced at the output of gate 71 to activate transfer gates 72 to sample the portion of the data stream stored in buffer register 70 in parallel and will pass the sampled bits of the data stream to comparison register 73. The sample applied to register 73 is stored therein as a reference signal for subsequent comparison through comparator 75 to the bits stored in monitor register 74.

The output of register 70 is alternately coupled to delay lines 76 and 77 of adjustable length through switch 78. The lengths of delay lines 76 and 77 are alternately adjusted by the range information coupled from range measurement system 29 through switching means 79. Using this technique the communication path length is adjusted to within 2 percent of a bit width by gated selection of delay line segments of delay lines 76 and 77 according to the digital range information provided from range measurement system 29. The output data stream passing through either of delay lines 76 or 77 is processed in shaper 80 prior to transmission from transmitter 11. The output data stream from delay lines 76 and 77 is coupled to shaper 80 through OR gate 81.

The data stream being coupled to the input of transmitter 11 is also coupled to switch S1 where through terminal 31 and contact 30 the data stream is fed to monitor register 74. Phase lock loop 32 is also coupled to the input of transmitter 11 and a portion of switch S1 through terminal 83 and contact 84 to provide an incoming clock to help load the data stream at the input of transmitter 11 into monitor register 74. The bits present in monitor register 74 are compared to the bits in the comparison register 73 in comparator 75. Actual coincidence of the data in monitor register 74 and comparison register 73 must occur with the arrival of a "1" bit in the last position of both registers since the sample was so selected as pointed out hereinabove. When coincidence is detected in comparator 75 a "START" output signal is coupled to range counter 85. This "START" signal initiates the operation of counter 85 to count the input clock from generator 8 whose frequency is selected to provide the resolution required in the range measurement. For delay setting to 5% of a bit width, or about 20 microseconds, a clock rate of 25 kilocycles is sufficient. This provides a resolution of 40 microseconds on a round trip measurement and 20 microseconds for the range count. To add a further margin, an 83.3 kc. clock will be used. The selection of the 83.3 kc. clock will be explained in connection with the description of the digitally controlled delay line as illustrated in FIG. 7.

The "START" signal from comparator 75 besides activating range counter 85 to count the incoming clock from generator 8 is also coupled to switch S1 to cause a movement of contacts 30 and 84 to terminals 32 and 86 to thereby connect monitor register 74 to monitor receiver 33. Phase lock loop 87 is coupled to the output of monitor receiver 33 and to terminal 86 of switch S1 to provide correct clock rates for the data stream received from monitor receiver 33 to properly load the data stream at the output of receiver 33 into monitor register 74.

Both the phase lock loops 82 and 87 are required since the rate of the data stream varies according to the Doppler due to changing range or to delay adjustment and it is important in the operation of this measurement system to obtain range information to provide register loading clocks which are synchronous to the data being loaded into these registers.

The portion of the data stream sampled in register 70 is transmitted from transmitter 11 over antenna 12 to the satellite included in a particular one of the communication paths. This satellite repeats the sampled portion of the data stream which is then detected by monitor receiver 33. The output of monitor receiver 33 is coupled to monitor register 74 and compared to the portion of the data stream stored in the comparison register 73. When coincidence is detected by comparator 75 between the portion of the data stream stored in registers 73 and 74 a "STOP" signal is generated and coupled to the range counter 85 to stop the counting thereof. Counter 85 will have a maximum count capacity proportional to twice the maximum slant range, and by proper division of two will produce an indication of actual range.

The maximum slant range determines the value of the constant delay which is to be maintained in this portion of the communication system. In other words, the artificial delay to be introduced in delay lines 76 and 77 under control of the delay registers 88 and 89, respectively, is equal to the maximum natural delay expected due to maximum range less the actual delay measured due to actual range. The indication of the counter after the "STOP" signal will be a function of the actual slant range. If range counter 85 is the binary type, the digital complement of the binary count of counter 85 plus 1 is a measure of the artificial delay to be introduced by the adjustable delay lines 76 and 77. This digital information proportional to the range is alternately stored in one of the two delay information registers 88 and 89 which controls the setting of the two delay lines 76 and 77. A more detailed description of the action of registers 88 and 89 and delay lines 76 and 77 will be presented hereinbelow with respect to the description of FIG. 7.

The objective of delay compensation is to maintain constant the total communication path delay between any two terminals through any satellite in the 5000 nautical mile satellite system set forth herein as an example for purposes of explanation. In the example under consideration this will be accomplished by providing delay compensation at both the receiver and transmitter ends of the communication path using measured slant range information supplied in digital form by the range measurement system of each terminal. A maximum delay of 18 milliseconds will be introduced at each end of the communication path. A maximum delay sum, that is, artificial and actual, of 48 milliseconds will be maintained during all phases of communication which will result in a total one way path delay of 96 milliseconds.

At 2400 bits per second, one bit is about 0.417 millisecond long. Path delay adjustment to at least 5% of a bit width or about 20 milliseconds is required. The selection and control of the required delay will be implemented using the delay information generated by the range measurement system 29 to properly set switching paths through the delay lines 76 and 77 as will be described hereinbelow with respect to FIG. 7.

Referring now to FIGS. 6 and 7, it will be observed that delay lines 76 and 77 are adjustable in increments of 6 microseconds which is about 2% of a bit width. This value was arbitrarily selected since it approximately corresponds to a range change of 1 mile (6.2 microseconds per mile). The actual increment value is not of vital importance so long as it is within the allowed tolerance of bit width variations. The range counter 85 (FIG. 6) will be used with an 83.3 kilocycle per second clock input, or one pulse every 12 microseconds. Since counter 85 actually measures twice the range to a satellite from a terminal, a change of 6 microseconds in range will change the count by one bit. The full count of counter 85 will be 8000 pulses or 96,000 microseconds divided by 12 microsecond intervals, which can be provided by a modified 13-bit binary counter.

As indicated previously, range measurements or range counts will be made 3 times per second and the complement of the count plus one represents the amount of delay to be introduced artificially. The complement of the range count plus one is alternately coupled to the two storage registers 88 and 89. The switching from one register to the other is controlled by the "STOP" signal to counter 85 by controlling the operation of switching means 79. For example, assuming that a count has just been completed and the complement count plus one is fed to delay information register 89. At the completion of the next count the complement count plus one will be directed to delay information register 88. Again, after the next count the complement count plus one from counter 85 is channeled by switching means 79 under control of the "STOP" signal from comparator 75 to register 89, and so forth. Slightly after activation of switching means 79 and in synchronism with the data stream, the "STOP" signals coupled to switch 78 through delay line 90 to switch the data stream from register 70 from delay line 76 to delay line 77, or vice versa, as the case may be. This arrangement provides that the bit stream is being delayed in delay line 76 or 77 according to the latest range measurement. Since the rate of change of range is expected to be continuous and at a rate no faster than 1 mile per second, the delay adjustment will be in 6 microsecond steps (either increase or decrease). Of course, it would be advantageous to provide an error detection system with the system disclosed to guarantee that system errors will not abruptly change the path length by amounts greater than 6 microseconds except during acquisition.

The use of two delay lines adjustable in 6 microsecond steps prevents any sudden introduction or deletion of bits in the data stream. At the most, the change in spacing between pulses emerging from delay line 76 with respect to those from delay line 77 will be ±6 microseconds. The data stream passing through a delay line when switching occurs will be processed through the OR gate 81 and will obviously emerge completely 417 microseconds minus the pulse width and ±6 microseconds before the first pulse emerges from the newly selected delay line. Thus, complete continuity is maintained.

It will be observed in FIG. 7 that the delay increase or decrease is adjusted in 6 microsecond steps and that the delay line segments are binary multiples of 6 microseconds and can thus be directly controlled by the range counter digital information without further calibration. To achieve a total delay of 18 milliseconds, as is set forth in the example employed herein, 12 line segments will be used in each delay line 76 and 77.

In accordance with the details of the illustration of FIG. 7, the output of the 12 stages of counter 85 (FIG. 6) is alternately coupled to registers 88 and 89 in parallel. A particular output of each stage of the registers 88 and 89 will enable AND gates 91 coupled to the output of the stages of register 89 and AND gates 92 coupled to the output of the stages of register 88. Let us assume, for purposes of explanation that a "1" output from a stage of the registers 88 and 89 will enable the AND gates 91 and 92. Thus, if a "1" output appears in a stage of the register 88 or 89, the AND gates 92 or 91 associated with the stages of these registers producing the "1" output will be enabled and will effectively short circuit the delay line section of delay lines 76 and 77 disposed in parallel to the enabled AND gate. This operation then will insert in the path of the data stream the appropriate amount of delay as dictated by the information measured by system 29 and more particularly in the counter 85 of FIG. 6.

As indicated previously, the range measurement system to accomplish compensation of the communication paths to maintain them constant and equal, particularly at handover, is only one embodiment of achieving instantaneous handover. It is also possible to provide the range information by means of a digital computer operating on pre-computed ephemeris data and extrapolated to provide continuous range information as a function of satellite position, that is, time. In certain instances there may appear to be serious drawbacks inherent in this particular solution to providing the range information. However, it is believed that these drawbacks can be overcome by employing extremely accurate, but possibly more complicated equipment. The first drawback may appear to be that the accuracy of long-term predicted data could become questionable but as time proceeds and as it has been recently demonstrated predicted data of long term is becoming less questionable. The second drawback may appear to be that of synchronization with respect to real time of the computer output data. This is a sensitive and delicate task which may be a significant source of error unless system timing and data prediction are precisely correlated. It is believed that this problem likewise can be overcome but with a more sophisticated system than is present in the range measurement system.

The one advantage of this predicted range information approach is that assuming the range sum information is sufficiently accurate and appropriate circuitry has been employed to resolve the timing problem, the delay compensation may be introduced at one terminal rather than at both terminals of the communication system as is required in the system employing range measurement. Thus, referring to FIG. 2, if predicted range information is employed, FIG. 2 would be modified to eliminate range measurement systems 34 and 55 as well as the digitally controlled delay lines 15, 22, 45 and 47 from terminal 2 and to substitute a computer for systems 29 and 51. The computer substituted for systems 29 and 51 then would provide the range information to control the delay lines 10 and 25 to maintain the communication path over satellite 4 constant and to control delay lines 40 and 50 to maintain the length of the communication path including satellite 5 constant and equal to the communication path including satellite 4.

Where the range information is supplied by a computer operating on predicted orbital data, the range information would be alternately coupled to the delay information registers, such as registers 88 and 89 of FIG. 6, to adjust the length of delay lines, such as delay lines 76 and 77, which are alternately connected into the communication paths.

With the range measurement system, the delay correction must be performed at both ends of the communication terminal to maintain the slant range between each terminal and a mutually visible satellite constant while in the predicted range information system, the delay correction is performed at one terminal to maintain the slant range sum between two terminals constant.

A system has been described hereinabove providing a medium altitude satellite communication system having instantaneous handover facilites wherein the data stream has a 2400 bit per second rate. The instantaneous handover system described hereinabove can easily be operated at rates lower than this assumed 2400 bit per second rate. The reason for this is that the bit lengths are now longer and tolerances may be relaxed somewhat. In particular, for very low data rates, say 100 bits per second, a smaller size sample for range measurement will be required since minimum round trip range delay will be about 60 milliseconds. A five bit data sample, for instance, will take 50 milliseconds to load into the range measurement monitor register on its way out. Ten milliseconds later the first return bit will appear. Keeping these considerations in mind, there is no reason why the system hereinabove described with respect to FIGS. 2 through 7 could not be capable of operating at any clock rate up to 2400 bits per second.

It is expected that satellite communication systems will be of greater demand and, thus, the data stream rate will need to be increased. Eventually it may be required for such a system to handle data rates up to 40.8 kilobits per second. Handling of these higher bit rates in an instantaneous handover system will require expansion and minor modifications of the system previously described. However, the basic principle of operation will be identical. Accuracy requirements in range measurement will be increased since the individual bit period is smaller. At 40 kilobits per second, the bit period is 25 microseconds. Alignment of bit streams to within 5% of a bit length, or 1.25 microseconds, implies a measurement of range to within 0.2 mile. For purposes of illustration, 1.5 microseconds will be used. The path length will have to be kept constant to within this 1.5 microsecond value.

To accomplish communication at this faster rate with a system in accordance with the principles of this invention, it will first be necessary to increase the clock rate to the counter to about 333 kilocycles per second. Next, it will be necessary to add two additional segments to the delay lines, such as delay lines 76 and 77. These two additional delay line segments will be added at the 6 microsecond end of the delay lines of FIG. 7 and will have a length of 3 microseconds coupled to the 6 microsecond section and a 1.5 microsecond section coupled to the 3 microsecond section. As described hereinabove, selection of the data stream bit path through the delay lines will be made by the delay information registers, such as registers 88 and 89, which will be two stages longer to handle the two bit increase output of the range counter (14 bits in all). The range counter full count will be increased to 32,000 pulses (a 15 bit binary code) or 96,000 microseconds divided by 3 microsecond intervals. A change of 3 microseconds in the range measurement reflects a change of 1.5 microseconds in the range or 0.25 mile.

Switching between the two delay lines of the digitally controlled delay lines, such as delay lines 76 and 77, (FIG. 6) will have to be accomplished in about 2 or 3 microseconds and in synchronism with the data stream so that no pulses are disturbed. Range sampling for this system will be increased to about 8 samples per second in accordance with the maximum expected range rate and the resolution required in the 40 kilobit per secnod system. In all other aspects, the 40 kilobit per second system is identical to the 2400 bit per second system described hereinabove.

The range measurement system for providing instantaneous handover, such as described in connection with FIG. 2 is based on measurement of slant range from the terminal to the satellite using the monitor channel to receive a return signal. Although a multi-bit message sample is used to measure range (for purpose of return identification) accuracy of the measurement is based strictly on detection of a single pulse in the bit stream, namely, the pulse which completes identification of the return data in the comparison register. This one pulse in accordance with the system described above is the "1" in the last position of the registers 70, 73, and 74 of FIG. 6. Range measurement accuracy, therefore, will be based on single pulse return detection.

Data at 2400 bits per second uses a standard 4 kilocycle per second channel, that is, about 3.1 kilocycles per second of bandwidth. The expected signal-to-noise ratio (S/N) in an operational system is assumed to be 30 decibels. The range accuracy $DT_R$ is approximately given by the following equation as set forth in Skolnik, M. I., "Introduction to Radar System," McGraw Hill:

$$DT_R = \frac{1}{B\sqrt{S/N}} \quad (1)$$

where B is the bandwidth. Substituting in Equation 1

$$DT_R = \frac{1}{3.1\times10^3\sqrt{1000}} = 10\mu \text{ sec.} \quad (2)$$

Since the bit width of a single bit at 2400 bits per second is 417 microseconds, this range accuracy is better than 2.5% of a bit width and is therefore adequate.

For data rates at 40.8 kilobits per second, a base bandwidth of about 69.5 kcs. is expected. Under these conditions, using Equation 1:

$$DT_R = \frac{1}{69.5 \times 10^3 \sqrt{1000}} = 0.453\mu \text{ sec.}$$

In this case, the bit width is 25$\mu$ sec. Clearly the range measurement is well within the 5% bit width tolerance specified.

The foregoing sets forth the problems and solutions for obtaining communication handover in a medium altitude multisatellite system. Various methods of handover are presented together with a description of the geometric boundaries of the basic problems along with the effect of variable path delay on voice, Teletype, and data transmission. The foregoing also describes in great detail an instantaneous handover system based on digital range measurement at each terminal applicable to medium altitude satellite systems using digital data rates of 2400 bits per second. It is also indicated that the expansion of this system to accommodate higher rates is relatively straightforward. While the description herein has been based primarily on a range measurement system to provide continuous path length delay compensation based on satellite range information as measured, it is also pointed out that this same compensation can be obtained by a computer from predicted ephemeris data.

The system described operates with data rates up to 2400 bits per second and is obviously capable of being achieved using straightforward digital delay techniques. These same techniques can easily be expanded, as indicated, to provide handover service at 40 kilobits per second or higher rates provided that sufficient range measurement accuracy is established.

While I have described above the principles of my invention in connection with specific apparatus, it is to be clearly understood that this description is made only by way of example and not as a limitation to the scope of my invention as set forth in the objects thereof and in the accompanying claims.

I claim:

1. A satellite communication system comprising:
a first terminal;
a second terminal;
at least one satellite mutually visible to both said first and second terminals to establish a communication path between said terminals through said one satellite;
first means included in at least one of said terminals to provide information proportional to the range between said one of said terminals and said one satellite; and
second means included in said communication path coupled to said first means responsive to said information to maintain the length of said communication path constant.

2. A system according to claim 1, wherein
said first means provides said information in digital form; and
said second means includes
a first delay line of adjustable length,
a second delay line of adjustable length,
means coupled to said delay lines to alternately couple said digital information to said first and second delay lines to adjust the length thereof in accordance with said digital information, and
means coupled to said delay lines to couple the last adjusted one of said first and second delay lines into said communication path.

3. A system according to claim 1, wherein
said first means includes third means to measure said range at a predetermined rate to provide said information in digital form at said predetermined rate; and
said second means includes
a first delay line of adjustable length,
a second delay line of adjustable length,
means coupled to said delay lines to alternately couple said digital information at said predetermined rate to said first and second delay lines to adjust the length thereof in accordance with said digital information, and
means coupled to said delay lines to couple the last adjusted one thereof into said communication path.

4. A system according to claim 3, wherein
said third means includes
a transmitter disposed in said one of said terminals to transmit a data stream to said one satellite at said predetermined rate,
a monitor receiver disposed in said one of said terminals to receive from said one satellite said data stream at said predetermined rate, and
means coupled to the input of said transmitter and the output of said monitor receiver to measure the length of time required for a given portion of said data stream to make the round trip between said one of said terminals and said one satellite to provide said information in digital form.

5. A satellite communication system comprising:
a first terminal;
a second terminal;
at least one satellite mutually visible to both said first and second terminals to establish a communication path between said terminals through said one satellite;
first means included in one of said terminals to measure the range between said one of said terminals and said one satellite and provide first information proportional to the measured range;
second means included in said one of said terminals coupled to said first means and said communication path responsive to said first information to insert a given amount of delay in said communication path;
third means included in the other of said terminals to measure the range between said other of said terminals and said one satellite and provide second information proportional to the measured range; and
fourth means included in said other of said terminals coupled to said third means and said communication path responsive to said second information to insert a given amount of delay in said communication path;
the amount of delay inserted in said communication path by said second and fourth means cooperating to maintain the length of said communication path constant.

6. A satellite communication system according to claim 5, wherein
said first and third means each measure their related range at a predetermined rate to provide said first and second information in digital form; and
said second and fourth means each include
a first delay line of adjustable length,
a second delay line of adjustable length,
means coupled to said delay lines to alternately couple said digital information at said predetermined rate to said first and second delay lines to adjust the length thereof in accordance with said digital information, and
means coupled to said delay lines to couple the last adjusted one thereof into said communication path.

7. A system according to claim 6, wherein
said first and third means each include a transmitter to transmit a data stream to said one satellite at said predetermined rate, a monitor receiver to receive from said one satellite said data stream at said predetermined rate, and means coupled to the input of said transmitter and the output of said monitor receiver to measure the length of time required for a given portion of said data stream to make the round trip between the related one of said first and second terminals and said one satellite to provide the related one of said first and second information in digital form.

8. A satellite communication system comprising:

a first terminal;

a second terminal;

a plurality of satellites mutually visible to both of said first and second terminals;

a first communication path between both said terminals through one of said plurality of satellites;

a source of data stream coupled to said first path for propagation therealong;

first means included in at least a selected one of said terminals to provide first information relative to said first path proportional to the range between said selected one of said terminals and said one of said plurality of satellites;

second means included in said first communication path coupled to said first means responsive to said first inforamtion to maintain the length of said first path constant;

a second communication path for propagation of said data stream between both said terminals through another of said plurality of satellites;

third means included in at least a given one of said terminals to provide second information relative to said second path proportional to the range between said given one of said terminals and said another of said plurality of satellites; and fourth means included in said second communication path coupled to said third means responsive to said second information to maintain the length of said second path constant and equal to the length of said first path.

9. A satellite communication system comprising:

a first terminal;

a second terminal;

a plurality of satellites mutually visible to both of said first and second terminals;

a first communication path between both said terminals through one of said plurality of satellites;

a source of data stream coupled to said first path for propagation therealong;

first means included in at least a selected one of said terminals to provide first information relative to said first path proportional to the range between said selected one of said terminals and said one of said plurality of satellites;

second means included in said first communication path coupled to said first means responsive to said first information to maintain the length of said first path constant;

a second communication path for propagation of said data stream between both said terminals through another of said plurality of satellites;

third means included in at least a given one of said terminals to provide second information relative to said second path proportional to the range between said given one of said terminals and said another of said plurality of satellites;

fourth means included in said second communication path coupled to said third means responsive to said second information to maintain the length of said second path constant and equal to the length of said first path; and fifth means coupled to said first and second communication paths and to said first and third means to maintain propagation of said data stream on one of said first and second paths and to terminate the propagation of said data stream on the other of said first and second paths.

10. A system according to claim 9, wherein said first and third means each include a sixth means to measure said range at a predetermined rate to provide said first and second information in digital form at said predetermined rate; and said second and fourth means each include a first delay line of adjustable length;

a second delay line of adjustable length;

means coupled to said delay lines to alternately couple the related one of said first and second digital information at said predetermined rate to said first and second delay lines to adjust the length thereof in accordance with said related one of said first and second digital information, and means coupled to said delay lines to couple the last adjusted one thereof into the related one of said first and second paths.

11. A system according to claim 10, wherein each of said sixth means include a transmitter to transmit said data stream to the related one of said plurality of satellites at said predetermined rate, a monitor receiver to receive from the related one of said plurality of satellites said transmitted data stream at said predetermined rate, and means coupled to the input of said transmitter and the output of said monitor receiver to measure the length of time required for a given portion of said data stream to make the round trip between the related one of said terminals and the related one of said plurality of satellites to provide the related one of said first and second information in digital form.

12. A system according to claim 9, wherein said fifth means includes means coupled to said first and third means to compare said data stream propagated on said first and second paths, and means coupled to said means to compare responsive to coincidence between said data stream propagated on said first and second paths to activate the transfer of operational communication from one of said paths to the other of said paths.

13. A satellite communication system comprising:

a first terminal;

a second terminal;

a plurality of satellites mutually visible to both of said first and second terminals;

a first communication path between both said terminals through one of said plurality of satellites;

a source of data stream coupled to said first path for propagation therealong;

first means included in one of said terminals to measure the range between said one of said terminals and said one of said plurality of satellites to provide first range information;

second means included in said one of said terminals coupled to said first means and said first path responsive to said first information to insert a given amount of delay in said first path;

a second communication path for propagation of said data stream between both said terminals through another of said plurality of satellites;

third means included in said one of said terminals to measure the range between said one of said terminals and said another of said plurality of satellites to provide second range information;

fourth means included in said one of said terminals coupled to said third means and said second path responsive to said second information to insert a given amount of delay in said second path;

fifth means included in the other of said terminals to measure the range between said other of said terminals and said another of said plurality of satellites to provide third range information;

sixth means included in said other of said terminals coupled to said fifth means and said first path responsive to said third information to insert a given amount of delay in said first path;

seventh means included in said other of said terminals to measure the range between said other of said terminals and said another of said plurality of satellites to provide fourth range information; and eighth means included in said other of said terminals coupled to said seventh means and said second path responsive to said fourth information to insert a given amount of delay in said second path;

the amount of delay inserted in said first path by said second means and said sixth means cooperating to maintain the length of said first path constant; and the amount of delay inserted in said second path by said fourth means and said eighth means cooperating to maintain the length of said second path constant and equal to the length of said first path.

14. A system according to claim 13, further including ninth means included in said one of said terminals coupled to said first and second paths; and tenth means included in said other of said terminals coupled to said first and second paths;

said ninth and tenth means each responding to the coincidence of said data stream on both said first and second paths to maintain propagation of said data stream on one of said first and second paths and to terminate propagation of said data stream on the other of said first and second paths.

15. A system according to claim 14, wherein said first, third, fifth and seventh means each include a transmitter to transmit said data stream to the related one of said plurality of satellites at said predetermined rate;

a monitor receiver to receive from the related one of said plurality of satellites said transmitted data stream at said predetermined rate, and means coupled to the input of said transmitter and the output of said monitor receiver to measure the length of time required for a given portion of said data stream to make the round trip between the related one of said terminals and the related one of said plurality of satellites to provide the related one of said first and second information in digital form.

16. A system according to claim 14, wherein said second, fourth, sixth and eighth means each include a first delay line of adjustable length;

a second delay line of adjustable length;

means coupled to said delay lines to alternately couple the related one of said first and second digital information at said predetermined rate to said first and second delay lines to adjust the length thereof in accordance with said related one of said first and second digital information, and means coupled to said delay lines to couple the last adjusted one thereof into the related one of said first and second paths.

17. In a satellite communication system including a communication path between two terminals through a satellite repeater:

first means disposed in at least one of said terminals to provide information proportional to the range between said one of said terminals and said repeater; and second means included in said communication path coupled to said first means responsive to said information to maintain said communication path length constant.

18. A system according to claim 17, wherein said first means includes third means to measure said range at a predetermined rate to provide said information in digital form at said predetermined rate; and said second means includes a first delay line of adjustable length, a second delay line of adjustable length, means coupled to said delay lines to alternately couple said digital information at said predetermined rate to said first and second delay lines to adjust the length thereof in accordance with said digital information, and means coupled to said delay lines to couple the last adjusted one thereof into said communication path.

19. In a satellite communication system for propagation of a data stream between two terminals through one of a plurality of satellites mutually visible to said two terminals:

first means disposed in at least a selected one of said terminals to provide first information proportional to the range between said selected one of said terminals and a selected one of said plurality of satellites;

second means disposed in a first communication path between said two terminals through said selected one of said plurality of satellites coupled to said first means responsive to said first information to maintain said first path length constant;

third means disposed in at least a given one of said terminals to provide second information proportional to the range between said given one of said terminals and another selected one of said plurality of satellites;

fourth means disposed in a second communication path between said two terminals through said another selected one of said plurality of satellites coupled to said third means responsive to said second information to maintain said second path length constant and equal to said first path length; and fifth means coupled to said first and second paths and to said first and third means to maintain propagation of said data stream on one of said first and second paths and to terminate the propagation of said data stream on the other of said first and second paths.

20. A system according to claim 19, wherein said first and third means each measure their related range at a predetermined rate to provide said first and second information in digital form; and said second and fourth means each include a first delay line of adjustable length;

a second delay line of adjustable length, means coupled to said delay lines to alternately couple said digital information at said predetermined rate to said first and second delay lines to adjust the length thereof in accordance with said digital information, and means coupled to said delay lines to couple the last adjusted one thereof into the related one of said first and second paths.

No references cited.

RODNEY D. BENNETT, *Primary Examiner.*

D. C. KAUFMAN, *Assistant Examiner.*